(12) United States Patent
Choi et al.

(10) Patent No.: US 7,404,993 B2
(45) Date of Patent: Jul. 29, 2008

(54) LIQUID CRYSTAL DISPLAY DEVICE AND METHOD OF FABRICATING THE SAME

(75) Inventors: Sang-Ho Choi, Gyeonggi-do (KR); Su-Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 11/477,821

(22) Filed: Jun. 30, 2006

(65) Prior Publication Data

US 2007/0116900 A1 May 24, 2007

(30) Foreign Application Priority Data

Nov. 18, 2005 (KR) ...................... 10-2005-0110751

(51) Int. Cl.
*C09K 19/00* (2006.01)
*C09K 19/52* (2006.01)

(52) U.S. Cl. ........................... 428/1.1; 438/1.2; 438/1.3; 430/20; 430/270.1; 252/299.01; 252/299.05

(58) Field of Classification Search .................. 428/1.3, 428/1.1; 252/299.01, 299.05; 430/20
See application file for complete search history.

(56) References Cited

U.S. PATENT DOCUMENTS

| 5,037,574 | A | * | 8/1991 | Frechet et al. | ......... 252/299.01 |
| 6,368,730 | B1 | * | 4/2002 | Kishimoto et al. | .......... 428/690 |
| 2007/0070282 | A1 | * | 3/2007 | Shibahara et al. | ........... 349/141 |
| 2007/0176145 | A1 | * | 8/2007 | Nishikawa et al. | ..... 252/299.01 |

OTHER PUBLICATIONS

Tetsuya Miyashita et al., "Optically Compensated Bend Mode (OCB Mode) with Wide Viewing Angle and Fast Response," *IEICE Transactions on Electronics*, vol. E79-C, No. 8, Aug. 1996, pp. 1076-1082.

* cited by examiner

*Primary Examiner*—Geraldina Visconti
(74) *Attorney, Agent, or Firm*—Morgan, Lewis & Bockius LLP

(57) ABSTRACT

A liquid crystal display device includes a first substrate; a second substrate facing the first substrate; a pixel electrode on the first substrate; a common electrodes on the second substrate; a first alignment layer on the pixel electrode; a second alignment layer on the common electrode; a liquid crystal layer between the first and second alignment layers, liquid crystal molecules of the liquid crystal layer disposed in a bend state; and a hydrogen-bonded structure in the liquid crystal layer, the hydrogen-bonded structure having a bow shape to maintain the bend state of the liquid crystal molecules.

18 Claims, 8 Drawing Sheets

LIQUID CRYSTAL DISPLAY DEVICE AND METHOD OF FABRICATING THE SAME

The present invention claims the benefit of Korean Patent Application No. 2005-0110751, filed in Korea on Nov. 18, 2005, which is hereby incorporated by reference.

BACKGROUND OF THE INVENTION

1. Field of the Invention

The present invention relates to a liquid crystal display device and a method of fabricating the same.

2. Discussion of the Related Art

Until recently, display devices have typically used cathode-ray tubes (CRTs). Presently, much effort has been made to develop various types of flat panel displays, such as liquid crystal display (LCD) devices, plasma display panels (PDPs), field emission displays, and electro-luminescence displays (ELDs), as substitutes for CRTs. Of these types of flat panel displays types, LCD devices have many advantages, such as high resolution, light weight, thin profile, compact size, and low power supply requirements.

In general, an LCD device includes two substrates that are spaced apart and facing each other with a liquid crystal layer interposed between the two substrates. The two substrates include electrodes that face each other such that a voltage applied between the electrodes induces an electric field across the liquid crystal layer. Alignment of the liquid crystal molecules in the liquid crystal layer changes in accordance with the intensity of the induced electric field into the direction of the induced electric field, thereby changing the light transmissivity of the LCD device. Thus, the LCD device displays images by varying the intensity of the induced electric field in respective pixel regions that make up the LCD device. Presently, fast response and wide viewing angle are needed for LCD devices. An optically compensated birefringence (OCB) mode LCD device has these characteristics.

FIG. 1 is a cross-sectional view of an OCB mode LCD device according to the related art. As shown in FIG. 1, an OCB mode LCD device 1 includes an array substrate, a color filter substrate, and a liquid crystal layer 58 between the two substrates.

In the array substrate, a gate line (not shown) and a data line 40 crossing the each other are formed on a first substrate 30. A thin film transistor Tr is disposed at a crossing of the gate line and the data line 40. A pixel electrode 49 is connected to a drain electrode 46 of the thin film transistor Tr. A first alignment layer 55 is disposed entirely on the substrate 30 having the pixel electrode 49.

In the color filter substrate, a black matrix 12 is disposed on a second substrate 10. A color filter layer 15 including red (R), green (G), and blue (B) color filter patterns 15a, 15b, and 15c is disposed to fill openings of the black matrix 12. A common electrode 18 is disposed on the color filter 15. A second alignment layer 25 is disposed on the common electrode 18.

The liquid crystal layer 58 is provided in a cell gap D between the array substrate and the color filter substrate. The first and second alignment layers 55 and 25 are rubbed in one direction so that liquid crystal molecules 59 in the liquid crystal layer 58 are arranged in the rubbed direction with a pre-tilt angle.

FIGS. 2A to 2C are cross-sectional views illustrating operations of an OCB mode LCD device according to the related art.

As shown in FIG. 2A, liquid crystal molecules 59 of the OCB mode LCD device 1 have an initial alignment state i.e., a splay state below a transition voltage (Vt). The liquid crystal molecules 59 adjacent to the array substrate and the color filter substrate are arranged with a tilt angle of $-\theta$ and $+\theta$ which are pre-tilt angles. A tilt angle of the liquid crystal molecules 59 are reduced toward a center portion of the liquid crystal layer 58. A tilt angle of the liquid crystal molecules 59 at the center portion is zero degrees.

As shown in FIG. 2B, when a voltage equal to or greater than the transition voltage (Vt) is applied, the liquid crystal molecules 59 transitions to a bend state from the splay state. The liquid crystal molecules 59 adjacent to the array substrate and the color filter substrate are still arranged with a tilt angle of $-\theta$ and $+\theta$. A tilt angle increases toward a center portion of the liquid crystal layer 58. A tilt angle of the liquid crystal molecules 59 at the center portion is 90 degrees. If a voltage below the transition voltage is applied or a voltage is not applied, the liquid crystal molecules 59 return to the splay state.

As shown in FIG. 2C, when a voltage to display a black image, i.e., a very high voltage is applied, most of the liquid crystal molecules 59, except for the liquid crystal molecules 59 adjacent to the array substrate and the color filter substrate, have a tilt angel of 90 degrees.

FIG. 3 is a graph illustrating a light transmittance to a voltage applied in an OCB mode LCD device according to the related art.

As shown in FIG. 3, the light transmittance is irregular below a transition voltage (Vt), and the light transmittance is reduced almost linearly at voltages equal to or greater than the transition voltage (Vt). The OCB mode LCD device uses a section where the light transmittance is varied linearly to normally display an image having gray levels. Accordingly, whenever the OCB mode LCD device is driven to normally display an image, a splay state should transition into the bend state at an initial stage. To do this, the related art OCB mode LCD device has a driving circuit that applies a voltage equal to or greater than the transition voltage (Vt) to transition the splay state into the bend state.

The light transmittance is highest at the transition voltage (Vt) so the brightest white image could be displayed at the transition voltage (Vt). However, since the voltage applied may have a deviation, the liquid crystal molecules may transition from the bend state back to the splay state near the transition voltage (Vt). To prevent this abnormal re-transition, a white voltage (Va) higher than the transition voltage (Vt) is used to display a white image. The bend state is more stable at the white voltage (Va) than at the transition voltage (Vt). However, the light transmittance at the white voltage (Va) is reduced (Tt>Ta). Therefore, brightness is reduced, and contrast ratio is also reduced.

SUMMARY OF THE INVENTION

Accordingly, the present invention is directed to a liquid crystal display device and a method of fabricating the same that substantially obviates one or more of problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a first substrate; a second substrate facing the first substrate; a pixel electrode on the first substrate; a common electrodes on the second substrate; a first alignment layer on the pixel electrode; a second alignment layer on the common electrode; a liquid crystal layer between the first and second alignment layers, liquid crystal molecules of the liquid crystal layer disposed in a bend state; and a hydrogen-bonded structure in the liquid crystal layer, the hydrogen-bonded structure having a bow shape to maintain the bend state of the liquid crystal molecules.

In another aspect, a method of fabricating a liquid crystal display device comprises interposing a liquid crystal layer between first and second substrates disposed facing each other, the liquid crystal layer including self assembled hydrogen-bonded fibers; heating the liquid crystal layer to a first temperature such that liquid crystal molecules and the self assembled hydrogen-bonded fibers have an isotropic state; and cooling the liquid crystal layer to a second temperature less than the first temperature and applying an electric field to the liquid crystal layer such that the liquid crystal molecules have a bend state and the self assembled hydrogen-bonded fibers form a hydrogen-bonded structure having a bow shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 4:
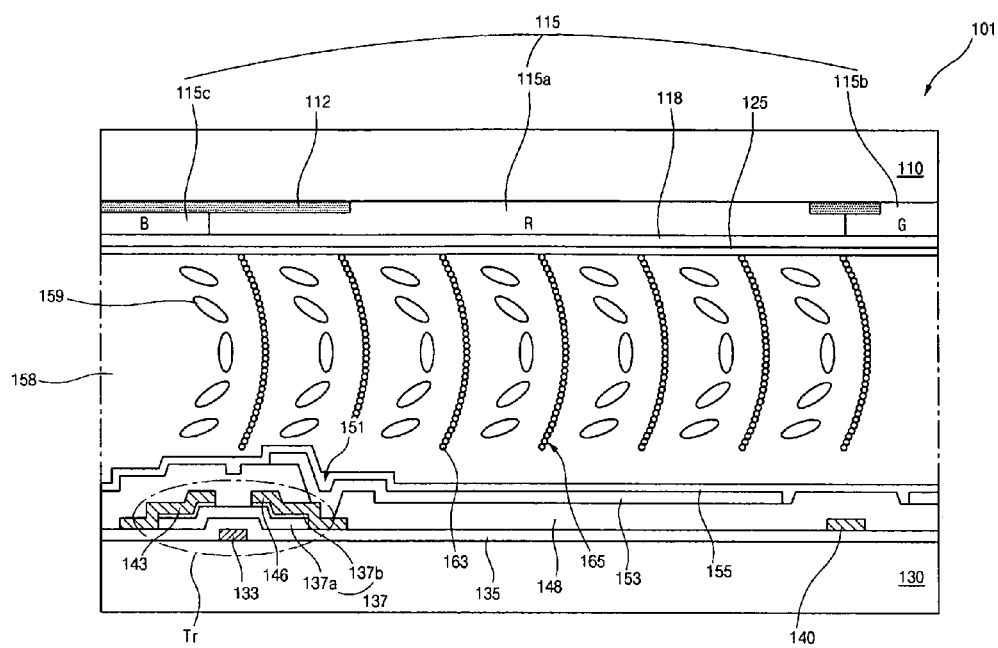
FIG. 4 is a cross-sectional view illustrating an OCB mode LCD device according to an exemplary embodiment of the present invention.

FIG. 4 is a cross-sectional view illustrating an OCB mode LCD device according to an exemplary embodiment of the present invention. As shown in FIG. 4, the OCB mode LCD device 101 according to the exemplary embodiment of the present invention includes an array substrate, a color filter substrate, and a liquid crystal layer 158 between the two substrates.

In the liquid crystal layer 158, liquid crystal molecules 159 having a bend state and a plurality of hydrogen-bonded structures 165 having a bow shape are arranged. The hydrogen-bonded structure 165 includes a plurality of self assembled hydrogen-bonded fibers 163. The self assembled hydrogen-bonded fibers 163 are hydrogen-bonded and fixed with a shape similar to an arrangement of the liquid crystal molecules 159 of the bend state so that the hydrogen-bonded structure 165 having the bow shape is formed. The self assembled hydrogen-bonded fibers 163 are arranged randomly at an initial stage. After the self assembled hydrogen-bonded fibers 163 are arranged like the arrangement of the liquid crystal molecules 159 to form the hydrogen-bonded structure 165, the hydrogen-bonded structure 165 continuously maintains the bow shape. The hydrogen-bonded structure 165 prevents the bend state of the liquid crystal molecules 159, which have previously transitioned once, from being transitioned back into the splay state even when a voltage below the transition voltage is applied or a voltage is not applied. The hydrogen-bonded structure 165 maintains the bend state so that a process of applying a transition voltage to transition the splay state into the bend state, like the related art, is not needed. Accordingly, the OCB mode LCD device according to the exemplary embodiment of the present invention does not need a separate driving circuit to apply a voltage to transition the splay state into the bend state, thereby reducing the product cost. Also, a voltage to emit a highest light transmittance is used as a voltage to display a brightest white image. Therefore, brightness and contrast ratio are improved.

In the array substrate, a gate line (not shown) and a gate electrode 133 branching off from the gate line are disposed on a first substrate 130. A gate insulating layer 135 is disposed on the gate line and the gate electrode 133. A semiconductor layer 137 is disposed on the gate insulating layer 135 corresponding to the gate electrode 133. The semiconductor layer 137 includes an active layer 137a and an ohmic contact layer 137b. Source and drain electrodes 143 and 146 are disposed on the semiconductor layer 137. The source electrode 143 branches off from a data line 140 which crosses the gate line to define a pixel region. The gate electrode 133, the semiconductor layer 137, and the source and drain electrodes 143 and 146 define a thin film transistor Tr. A passivation layer 148 is disposed on the source and drain electrodes 143 and 146 and the data line 140. The passivation layer 148 has a drain contact hole 151 exposing the drain electrode 146. A pixel electrode 153 is disposed on the passivation layer 148 in the pixel region. The pixel electrode 153 contacts the drain electrode 146 through the drain contact hole 151. A first alignment layer 155 is disposed entirely on the first substrate 130 having the pixel electrode 153.

In the color filter substrate, a black matrix 112 is disposed on a second substrate 110. The black matrix 112 may correspond to the gate line, the data line 140, and the thin film transistor Tr. A color filter layer 115 fills an opening of the black matrix 112 and overlaps the black matrix 112. The color filter layer 115 includes red (R), green (G), and blue (B) color filter patterns 115a, 115b, and 115c corresponding to the respective pixel regions. A common electrode 118 is disposed on the color filter layer 115. A second alignment layer 125 is disposed on the common electrode 118.

The first and second alignment layers 155 and 125 are rubbed to align the liquid crystal molecules 159 at initial stage. An overcoat layer (not shown) may be disposed between the color filter layer 115 and the common electrode 118.

The bend state of the liquid crystal molecules 159 is maintained without applying a transition voltage because the hydrogen-bonded structure 165 keeps the liquid crystal molecules 159 in the bend state continuously. Therefore, once the liquid crystal molecules 159 have the bend state, the bend state is not transitioned back to the splay state.

A method of fabricating the array substrate and the color filter substrate will now be explained with reference to FIG. 4.

A first metallic material is deposited on the first substrate 130. A mask process including photoresist-depositing, light-exposing, photoresist-developing, and etching is performed to pattern the first metallic material, thereby forming the gate line (not shown) and the gate electrode 133. The gate insulating layer 135 is formed on the first substrate 130 having the gate electrode 133. A semiconductor material is deposited on the gate insulating layer 135 and patterned to form the semiconductor layer 137. The active layer 137a may be made of intrinsic amorphous silicon, and the ohmic contact layer 137b may be made of impurity-doped amorphous silicon.

A second metallic material is deposited on the first substrate 130 having the semiconductor layer 137 and patterned to form the source and drain electrodes 143 and 146 and the data line 140. The passivation layer 148 is formed on the first substrate 130 having the source and drain electrodes 143 and 146. The passivation layer 148 is patterned to form the drain contact hole 151 exposing the drain electrode 146.

A transparent conductive material is deposited on the passivation layer 148 and patterned to form the pixel electrode 153. The transparent conductive material may include indium-tin-oxide (ITO), indium-zinc-oxide (IZO) or indium-tin-zinc-oxide (ITZO). The first alignment layer 155 is formed on the substrate 130 having the pixel electrode 153 and rubbed along one direction to complete the array substrate.

To fabricate the color filter substrate, chromium (Cr) or black resin is deposited on the second substrate 110 and patterned to form the black matrix 112. Red, green, and blue resins are sequentially deposited on the second substrate 110 having the black matrix 112 and patterned to form the red (R), green (G), and blue (B) color filter patterns 115a, 115b, and 115c in the corresponding pixel regions.

A transparent conductive material is deposited on the color filter layer 115 to form the common electrode 118. The transparent conductive material may include indium-tin-oxide (ITO), indium-zinc-oxide (IZO), or indium-tin-zinc-oxide (ITZO). The second alignment layer 125 is formed on the common electrode 118. The second alignment layer 125 may be rubbed along the direction as the first alignment layer 155 to complete the color filter substrate.

The array substrate and the color filter substrate as fabricated above are attached by a seal pattern (not shown). Then, a liquid crystal material 159 is filled between the two substrates. Here, the liquid crystal material 159 includes a hydrogen-bonded structure 165.

Figure 5A:
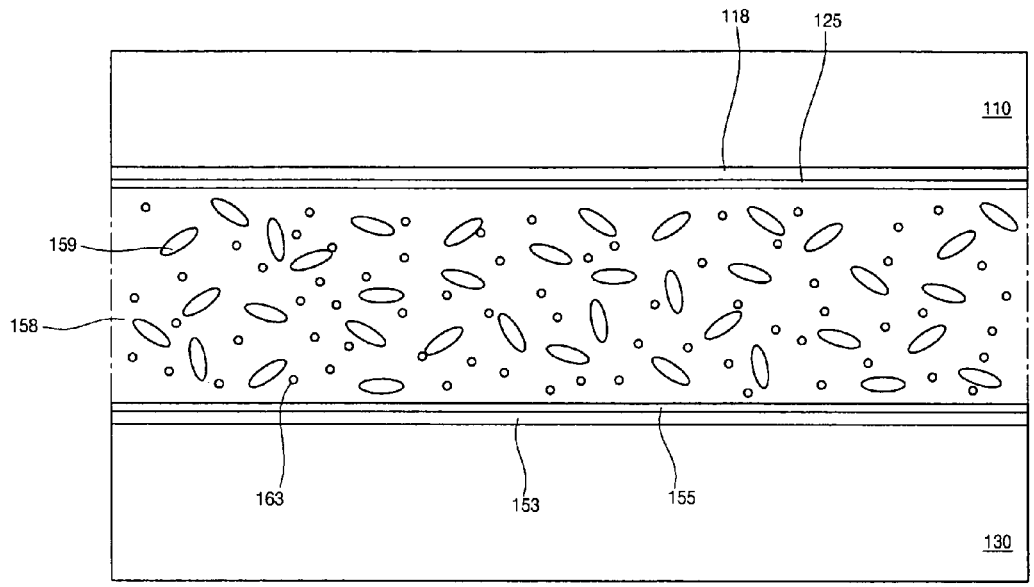
FIGS. 5A to 5C are cross-sectional views illustrating a method of forming a hydrogen-bonded structure according to an exemplary embodiment of the present invention.
Figure 5B:
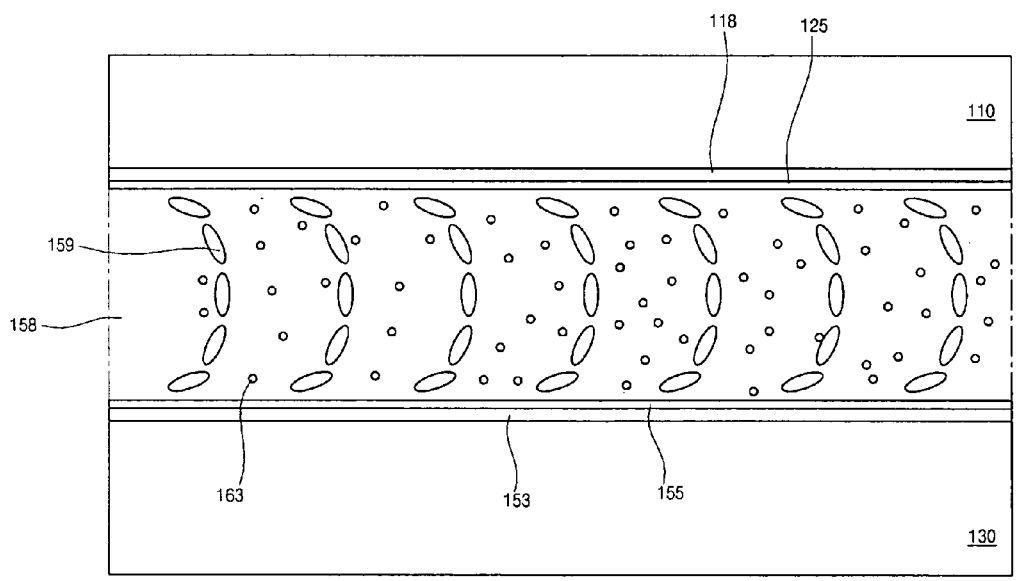
Figure 5C:
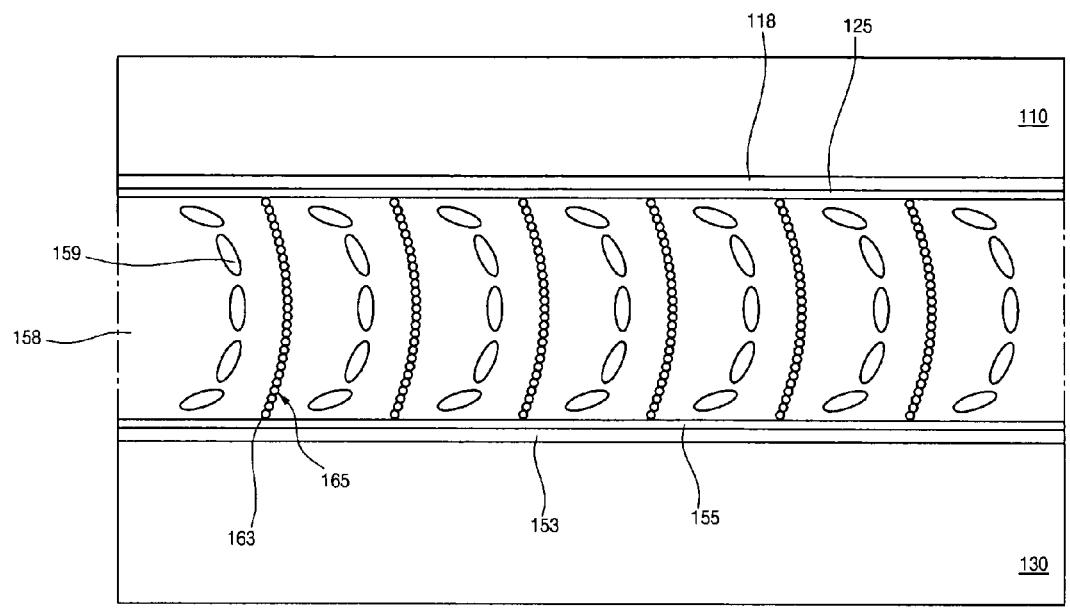

FIGS. 5A to 5C are cross-sectional views illustrating a method of forming a hydrogen-bonded structure according to an exemplary embodiment of the present invention. In FIGS. 5A to 5C, descriptions of portions shown in FIG. 4 are omitted to simplify the explanation.

As shown in FIG. 5A, a liquid crystal material 159 including self assembled hydrogen-bonded fibers 163 is injected between the first and second alignment layers 155 and 125 to form a liquid crystal layer 158. A nematic liquid crystal material may be used. The self assembled hydrogen-bonded fibers 163 includes hydrogen (H) and at least one atom having high electronegativity, for example, fluorine (F), nitrogen (N), or oxygen (O), so that hydrogen-bonding occurs under a specific condition. As an example of a self assembled hydrogen-bonded fiber 163, a material known as "Lsy18" having a structural formula,

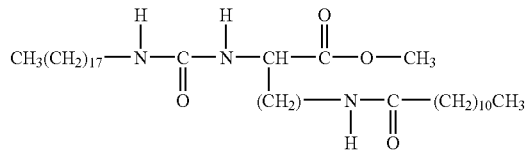

may be used.

Figure 1:
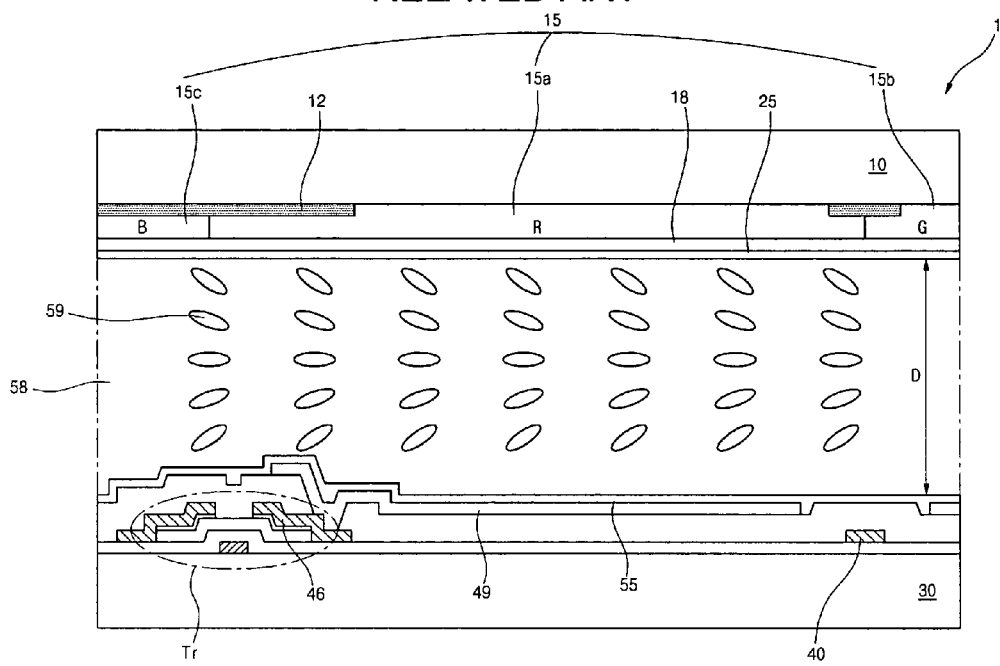
FIG. 1 is a cross-sectional view of an OCB mode LCD device according to the related art.
Figure 2A:
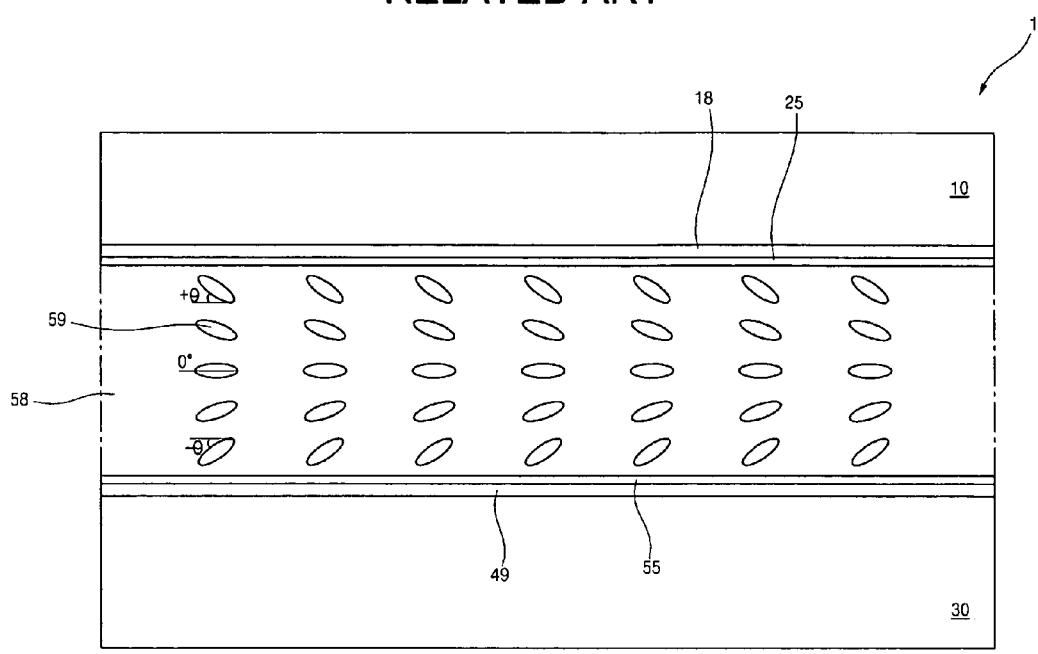
FIGS. 2A to 2C are cross-sectional views illustrating operations of an OCB mode LCD device according to the related art.
Figure 2B:
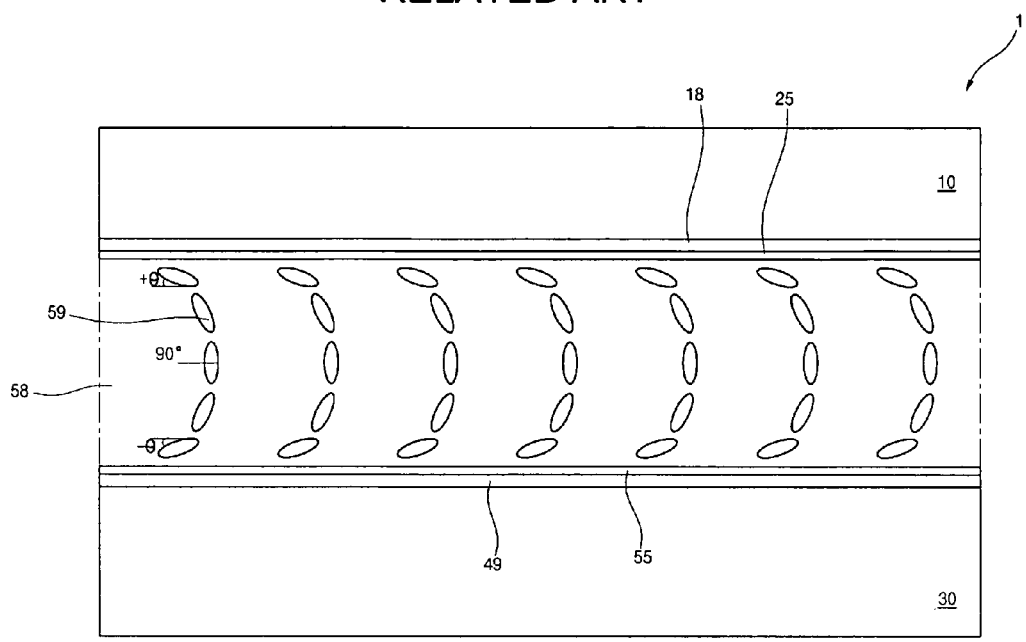
Figure 2C:
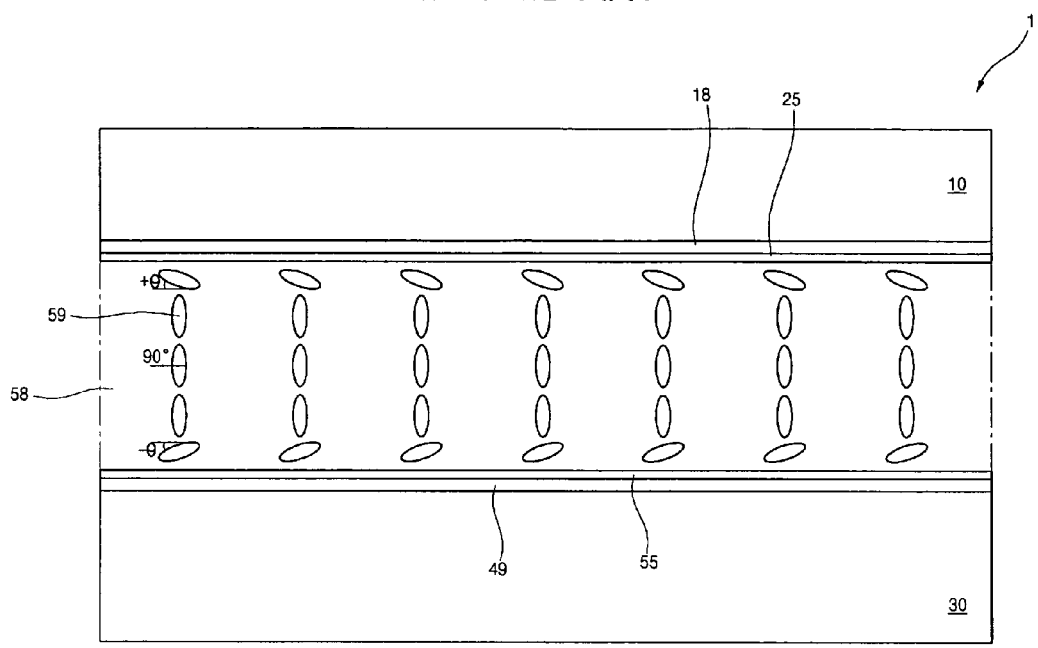
Figure 3:
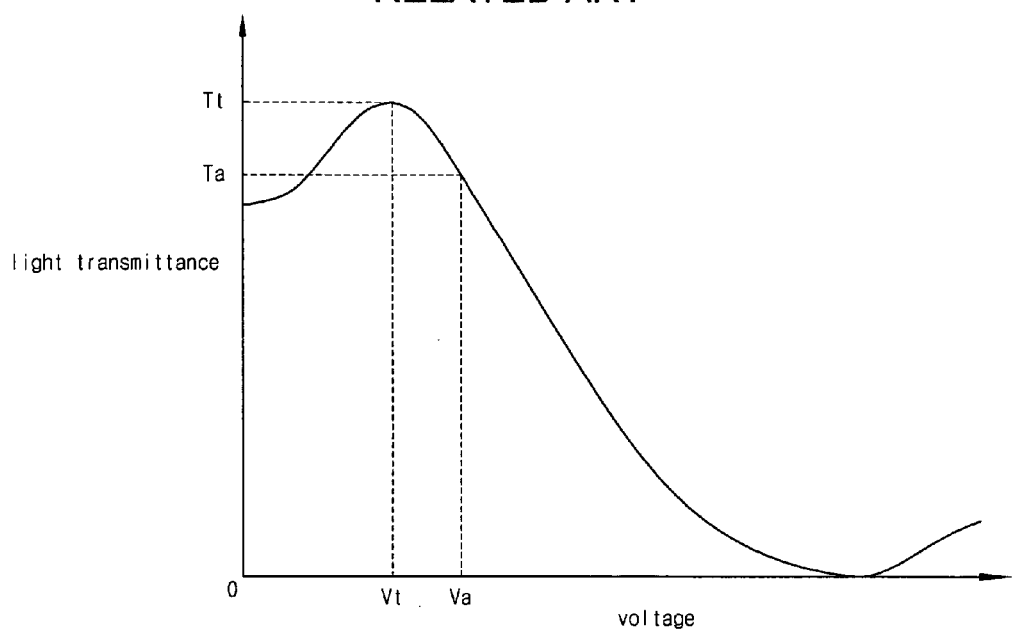
FIG. 3 is a graph illustrating a light transmittance to a voltage applied in an OCB mode LCD device according to the related art.

The liquid crystal material including the self assembled hydrogen-bonded fibers 163 may be injected between the array substrate and the color filter substrate at a normal temperature (room temperature). The liquid crystal molecules 159 may have a splay state similar to FIG. 2A immediately after injection.

The LCD device, where the liquid crystal material 159 is injected, is heated to a temperature of about 70 to 90 degrees centigrade. By the heating process, the liquid crystal molecules 159 and the self assembled hydrogen-bonded fibers 163 are arranged randomly. The liquid crystal molecules 159 and the self assembled hydrogen-bonded fibers 163 have an isotropic state.

As shown in FIG. 5B, the LCD device is gradually cooled to a normal temperature, and a specific voltage is applied during the cooling process. The specific voltage transitions the random state (isotropic state) of the liquid crystal molecules 159 into a bend state. The specific voltage may be equal to or greater than the related art transition voltage. The specific voltage may be applied to the pixel electrode (153 of FIG. 4) so that an electric field is generated between the pixel electrode and the common electrode (118 of FIG. 4). By the electric field, the liquid crystal molecules 159 are arranged to have the bend state.

As shown in FIG. 5C, the self assembled hydrogen-bonded fibers 163 are also arranged with the same arrangement as the liquid crystal molecules 159. An arrangement of the self assembled hydrogen-bonded fibers 163 forms a bow shape. A plurality of bow-shaped arrangements formed by the self assembled hydrogen-bonded fibers 163 are formed in the pixel region. The self assembled hydrogen-bonded fibers 163 are hydrogen-bonded to form a hydrogen-bonded structure 165 at a specific temperature, for example, at a temperature equal to or less than 70 degrees centigrade.

After the hydrogen-bonded structure 165 is formed, the electric field is removed. Although the electric field is removed, the hydrogen-bonded structure 165 still remains because of strong hydrogen-bonding between the self assembled hydrogen-bonded fibers 163. Since the hydrogen-bonded structure 165 has a bow shape similar to the arrangement of the liquid crystal molecules 159 in the bend state, the bend state of the liquid crystal molecules 159 surrounded by the hydrogen-bonded structure 165 is not transitioned back to the splay or isotropic state but still remains.

The specific temperature to start the hydrogen-bonding is about 70 degrees centigrade, and the temperature is much higher than a temperature to normally drive the LCD device. Accordingly, the hydrogen-bonding of the hydrogen-bonded structure 165 is scarcely unfastened, and the self assembled hydrogen-bonded fibers 163 scarcely return to the isotropic state.

As explained above, the liquid crystal layer 158 continuously having the bend state is formed between the attached array and color filter substrates. A modulization process of attaching driving circuits and cover frames to the LCD device having the liquid crystal layer 158 of the bend state is performed to complete the OCB mode LCD device. Since the liquid crystal molecules maintain the bend state continuously after the OCB mode LCD device is fabricated, the transition voltage transiting the splay state into the bend state like the related is not needed, and the separate driving circuit generating the transition voltage is not needed. Therefore, the product cost can be reduced.

Since the liquid crystal molecules 159 maintain the bend state without applying the transition voltage, a white voltage higher than the transition voltage like the related art is not needed. Therefore, brightness and contrast ratio are improved.

In the above exemplary embodiment, the liquid crystal molecules maintain the bend state without applying a voltage because the hydrogen-bonded structure supports the arrangement of the liquid crystal molecules in the bend state. A voltage may be applied to drive the OCD mode LCD device more stably. Even when no voltage is applied, the bend state of the liquid crystal molecules is maintained due to the hydrogen-bonded structure. However, this bend state depends on the hydrogen-bonded structure. Therefore, a bend state not depending on the hydrogen-bonded structure may be more stable than the bend state depending on the hydrogen-bonded structure when displaying an image. To do this, a minimum voltage may be applied. The minimum voltage may be less than that of the related art transition voltage because the related art transition voltage transitions the splay state into the bend state. However, the minimum voltage changes the dependent bend state into the independent bend state. The transition time from the dependent bend state to the independent bend state is also reduced in comparison with the related art transition time from the splay state to the bend state. If the minimum voltage is set to a voltage corresponding to a highest light transmittance and the minimum voltage is used as a white voltage, brightness and contrast ratio are improved.

It will be apparent to those skilled in the art that various modifications and variations can be made in the liquid crystal display device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate facing the first substrate;
   a pixel electrode on the first substrate;
   a common electrodes on the second substrate;
   a first alignment layer on the pixel electrode;
   a second alignment layer on the common electrode;
   a liquid crystal layer between the first and second alignment layers, liquid crystal molecules of the liquid crystal layer disposed in a bend state; and
   a hydrogen-bonded structure in the liquid crystal layer, the hydrogen-bonded structure having a bow shape to maintain the bend state of the liquid crystal molecules.

2. The device according to claim 1, wherein the hydrogen-bonded structure includes a plurality of self assembled hydrogen-bonded fibers arranged in the bow shape.

3. The device according to claim 2, wherein the self assembled hydrogen-bonded fiber includes at least one of fluorine (F), nitrogen (N), oxygen (O) and atoms having electronegativity properties corresponding thereto.

4. The device according to claim 2, wherein the self assembled hydrogen-bonded fiber includes Lys18 having a structural formula,

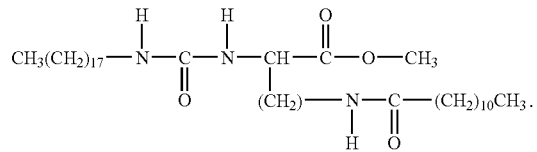

5. The device according to claim 2, wherein the self assembled hydrogen-bonded fibers have an isotropic state at temperatures greater than a transition temperature and is hydrogen-bonded at temperatures below the transition temperature.

6. The device according to claim 5, wherein the transition temperature is about 70 degrees centigrade.

7. The device according to claim 1, further comprising a color filter layer on the second substrate.

8. The device according to claim 1, further comprising gate and data lines crossing each other, and a thin film transistor connected to the gate and data lines and the pixel electrode.

9. A method of fabricating a liquid crystal display device, comprising:
   interposing a liquid crystal layer between first and second substrates disposed facing each other, the liquid crystal layer including self assembled hydrogen-bonded fibers;
   heating the liquid crystal layer to a first temperature such that liquid crystal molecules and the self assembled hydrogen-bonded fibers have an isotropic state; and
   cooling the liquid crystal layer to a second temperature less than the first temperature and applying an electric field to the liquid crystal layer such that the liquid crystal molecules have a bend state and the self assembled hydrogen-bonded fibers form a hydrogen-bonded structure having a bow shape.

10. The method according to claim 9, wherein the self assembled hydrogen-bonded fiber includes at least one of fluorine (F), nitrogen (N), oxygen (O) and atoms having electronegativity properties corresponding thereto.

11. The method according to claim 9, wherein the self assembled hydrogen-bonded fiber includes Lys18 having a structural formula, $$CH_3(CH_2)_{17}-\underset{\underset{O}{\|}}{\overset{\overset{H}{|}}{N}}-C-\underset{}{\overset{\overset{H}{|}}{N}}-\underset{\underset{(CH_2)}{|}}{CH}-\overset{\overset{O}{\|}}{C}-O-CH_3$$
$$(CH_2)-\underset{\overset{H}{|}}{N}-\overset{\overset{O}{\|}}{C}-(CH_2)_{10}CH_3.$$

12. The method according to claim 9, wherein the self assembled hydrogen-bonded fibers have an isotropic state at temperatures greater than a transition temperature and is hydrogen-bonded at temperatures below the transition temperature.

13. The method according to claim 12, wherein the transition temperature is about 70 degrees centigrade.

14. The method according to claim 13, wherein the first temperature is about 70 to 90 degrees centigrade.

15. The method according to claim 12, wherein the first temperature is greater than the transition temperature, and the second temperature is less than the transition temperature.

16. The method according to claim 9, wherein the second temperature is substantially room temperature.

17. The method according to claim 9, further comprising forming a pixel electrode on the first substrate and a first alignment layer on the pixel electrode.

18. The method according to claim 9, further comprising forming a common electrode on the second substrate and a second alignment layer on the common electrode.

* * * * *